United States Patent
Ewing et al.

(10) Patent No.: US 10,562,650 B2
(45) Date of Patent: Feb. 18, 2020

(54) CORRUGATED PAYLOAD ADAPTOR STRUCTURE

(71) Applicant: The Boeing Company, Chicago, IL (US)

(72) Inventors: Richard Forrest Ewing, Everett, WA (US); Robert Lane, Seattle, WA (US)

(73) Assignee: The Boeing Company, Chicago, IL (US)

( * ) Notice: Subject to any disclaimer, the term of this patent is extended or adjusted under 35 U.S.C. 154(b) by 473 days.

(21) Appl. No.: 15/635,198

(22) Filed: Jun. 28, 2017

(65) Prior Publication Data

US 2019/0016483 A1   Jan. 17, 2019

(51) Int. Cl.
*B64G 1/64* (2006.01)
*B29C 70/42* (2006.01)
*B29L 31/30* (2006.01)

(52) U.S. Cl.
CPC .............. *B64G 1/641* (2013.01); *B29C 70/42* (2013.01); *B29L 2031/3097* (2013.01)

(58) Field of Classification Search
CPC ........................................................ B64G 1/641
USPC ....................................................... 244/173.2
See application file for complete search history.

(56) References Cited

U.S. PATENT DOCUMENTS

| | | | |
|---|---|---|---|
| 1,496,304 A | | 6/1924 | Dornier |
| 3,351,307 A | * | 11/1967 | Poncel ............ B64G 1/50 244/173.2 |
| 3,620,895 A | * | 11/1971 | Bailey ............ B01D 69/10 210/493.5 |
| RE27,747 E | * | 9/1973 | Name Not Available ............ B22F 3/1115 165/166 |
| 4,769,968 A | * | 9/1988 | Davis ............ B64C 1/12 52/798.1 |
| 5,655,757 A | * | 8/1997 | Starkovich ............ B64G 1/22 188/267 |
| 5,848,765 A | * | 12/1998 | Gillespie ............ B64C 9/18 244/124 |
| 6,199,801 B1 | * | 3/2001 | Wilke ............ B64G 1/641 244/131 |
| 6,202,961 B1 | * | 3/2001 | Wilke ............ B64G 1/641 188/378 |
| 6,244,541 B1 | * | 6/2001 | Hubert ............ B64G 1/22 244/173.2 |
| 6,345,788 B1 | * | 2/2002 | Shtarkman ............ B29C 70/025 244/173.2 |

(Continued)

FOREIGN PATENT DOCUMENTS

WO   WO-2012086515 A1 *   6/2012   ............. F16F 15/02

OTHER PUBLICATIONS

"Space Launch System—Block 1 Expanded View;" NASA; accessed Jun. 27, 2017; https://www.nasa.gov/sites/default/files/thumbnails/image/sls_block_1_expanded_view_orion.jpg.

*Primary Examiner* — Christopher P Ellis
(74) *Attorney, Agent, or Firm* — Yee & Associates, P.C.

(57) ABSTRACT

A spacecraft. The spacecraft includes a rocket engine; a first stage connected to the rocket engine; and a payload stage connected to the first stage. The spacecraft also includes a payload structure inside the payload stage between a first compartment of the payload stage and a second compartment of the payload stage. The payload structure may be a single shell that has a corrugated shape such that an inside surface and an outside surface of the payload structure vary in shape to form the corrugations.

20 Claims, 5 Drawing Sheets

(56) References Cited

U.S. PATENT DOCUMENTS

| | | | | |
|---|---|---|---|---|
| 6,371,412 | B1* | 4/2002 | Osterberg | B64G 1/641 244/1 N |
| 6,588,707 | B1* | 7/2003 | Hubert | B64G 1/641 244/173.2 |
| 7,007,896 | B2* | 3/2006 | Telford | B64G 1/641 244/173.2 |
| 7,090,171 | B2* | 8/2006 | Peck | B64G 1/002 244/173.2 |
| 7,222,823 | B2* | 5/2007 | Thomas | B64G 1/641 244/173.2 |
| 7,905,453 | B2* | 3/2011 | Benedict | B64G 1/641 244/172.4 |
| 8,146,620 | B2 | 4/2012 | Lupke et al. | |
| 2006/0145026 | A1* | 7/2006 | Lancho Doncel | B64G 1/641 244/173.2 |
| 2015/0292225 | A1* | 10/2015 | Gonda | E04C 2/34 52/630 |

* cited by examiner

US 10,562,650 B2

CORRUGATED PAYLOAD ADAPTOR STRUCTURE

BACKGROUND INFORMATION

1. Field

The present disclosure relates to methods and devices for payload structures for spacecraft, particularly the present disclosure relates to mounting structures within the payload space of a spacecraft.

2. Background

Spacecraft and launch vehicles, particularly rockets, have payload spaces within them to deliver a payload. The payload may be, for example, one or more satellites, modules, or other objects.

However, the payload may be subject to significant vibration and other stresses during launch of the spacecraft. Thus, payload structures may be provided inside the payload space in order to help secure the payload.

SUMMARY

The illustrative embodiments provide for a method for a spacecraft. The spacecraft includes a rocket engine; a first stage connected to the rocket engine; and a payload stage connected to the first stage. The spacecraft also includes a payload structure inside the payload stage between a first compartment of the payload stage and a second compartment of the payload stage. The payload structure may be a single shell that has a corrugated shape such that an inside surface and an outside surface of the payload structure vary in shape to form the corrugations.

The illustrative embodiments also provide for a payload structure. The payload structure may be a shell comprising a fiber-reinforced composite laminate material, the shell having a corrugated frustoconical shape such that an inside surface and an outside surface of the payload structure vary in shape to form corrugations. Corrugations vary in at least one of amplitude and period along a longitudinal direction of the shell. The amplitude is a height between where the corrugations reach a maximum or a minimum relative to an average distance between minimums and maximums of the corrugations. The period is a measure of how close the corrugations are to each other.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account that a payload structure may be provided within a spacecraft to separate and/or protect one or more objects within a payload space of the spacecraft. The illustrative embodiments further recognize and take into account that payload structures should be both strong and as lightweight as possible in order to maximize the lift capacity of the spacecraft.

Additionally, the illustrative embodiments recognize and take into account that since the bottom and top diameters of a payload structure are typically different in size, the top and the bottom have different distances to spread the tension and compression needed to react the moment at the interface of the payload to the payload structure. This loading may be due to the distance from the spacecraft center of gravity and the interface during flight maneuvers that introduce off-axis, or sideways, accelerations. The running load, in terms of axial pounds per inch of circumference, is higher at the top because the circumference is smaller.

Thus, the illustrative embodiments provide for a payload structure with corrugation stiffening to truncated conical structures fabricated with solid laminate composite materials. The use of composite materials facilitates variation in material volume created by the addition of corrugations to a solid laminate design. Variations in period and amplitude between the top and bottom of truncated conical geometry can be incorporated in a solid laminate part design.

The application of corrugations to truncated conical composite structure offers weight reduction opportunities over unstiffened designs that were not previously recognized for payload structures in spacecraft. In addition, the illustrative embodiments may provide for varying corrugation amplitude and period to facilitate optimizing local structural stability requirements for these thin shell structures with large dimensional difference between their extremities; namely, a small top and a large bottom. Thus, the illustrative embodiments provide for a corrugated payload adaptor structure.

Figure 1:
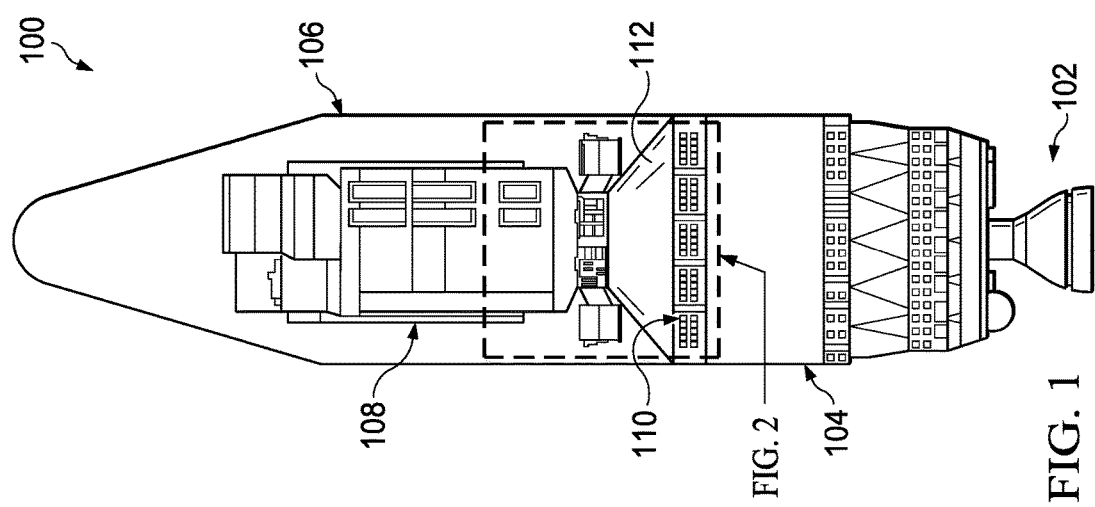
FIG. 1 illustrates a spacecraft, in accordance with an illustrative embodiment.

FIG. 1 illustrates a spacecraft, in accordance with an illustrative embodiment. Spacecraft 100 is depicted as a rocket having multiple stages. However, spacecraft 100 can be a single stage rocket, or can be another type of spacecraft such as a reusable spacecraft like the space shuttle. Thus, the illustrative embodiments are not necessarily limited to the rocket shown in FIG. 1 and FIG. 2.

Spacecraft 100 includes rocket engine 102, but may have some other propulsion system. Spacecraft 100 also includes upper stage 104, which may carry fuel and may be ejected after the fuel has been consumed during launch. Spacecraft 100 may also include payload compartment 106 carrying cargo 108. Cargo 108 may be a satellite or some other smaller spacecraft, or could be some other cargo. Additional cargo, such as secondary cargo 110, may be present. Payload structure 112 may be placed inside spacecraft 100 as a means for providing vibration isolation for cargo 108 within payload compartment 106.

Figure 2:
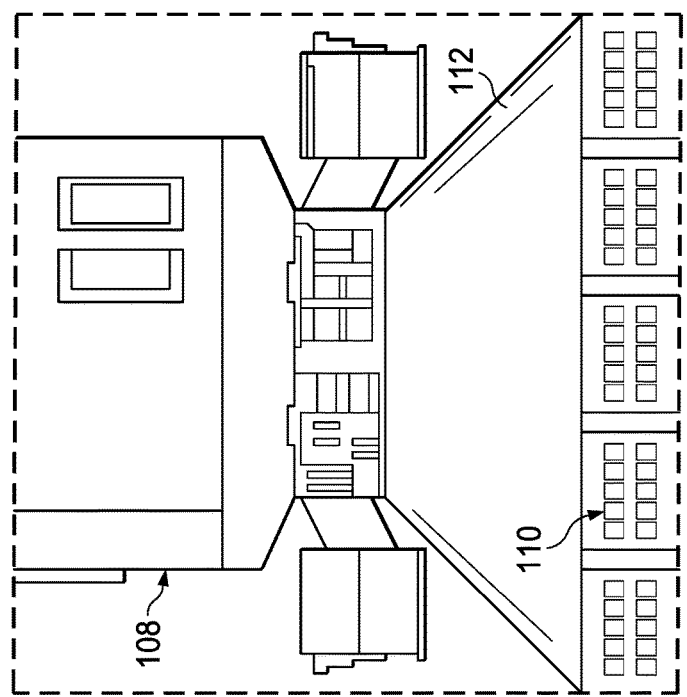
FIG. 2 illustrates an interior of the spacecraft shown in FIG. 1, in accordance with an illustrative embodiment.

FIG. 2 illustrates an interior of the spacecraft shown in FIG. 1, in accordance with an illustrative embodiment. FIG. 2 is an expanded view of a portion of FIG. 1. Thus, FIG. 1 and FIG. 2 share common reference numerals and refer to common objects.

Figure 3:
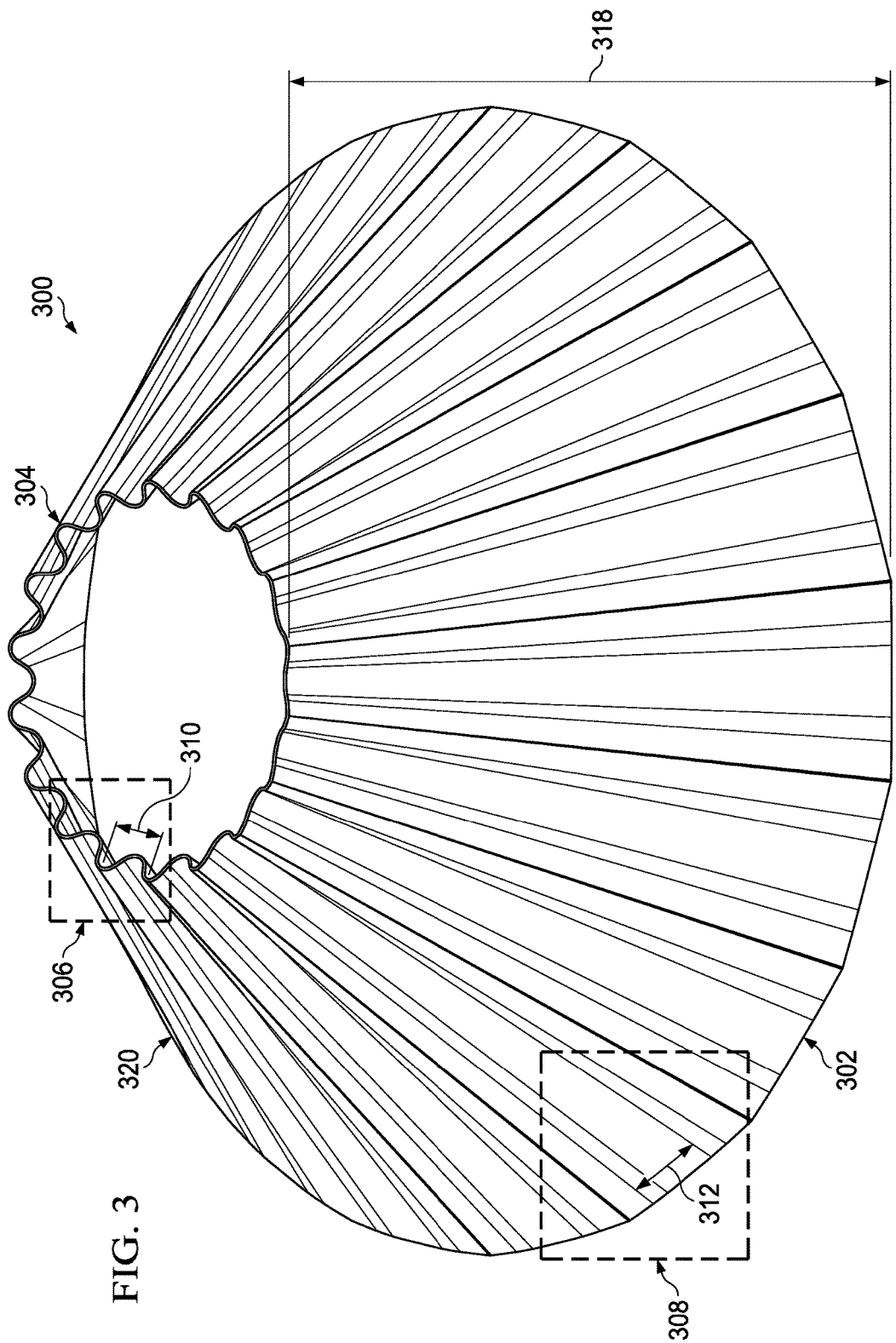
FIG. 3 illustrates a payload structure for a spacecraft, in accordance with an illustrative embodiment.
Figure 4:
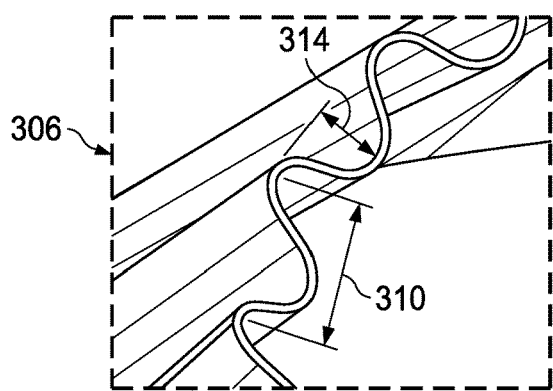
FIG. 4 illustrates a view of the payload structure shown in FIG. 3, in accordance with an illustrative embodiment.
Figure 5:
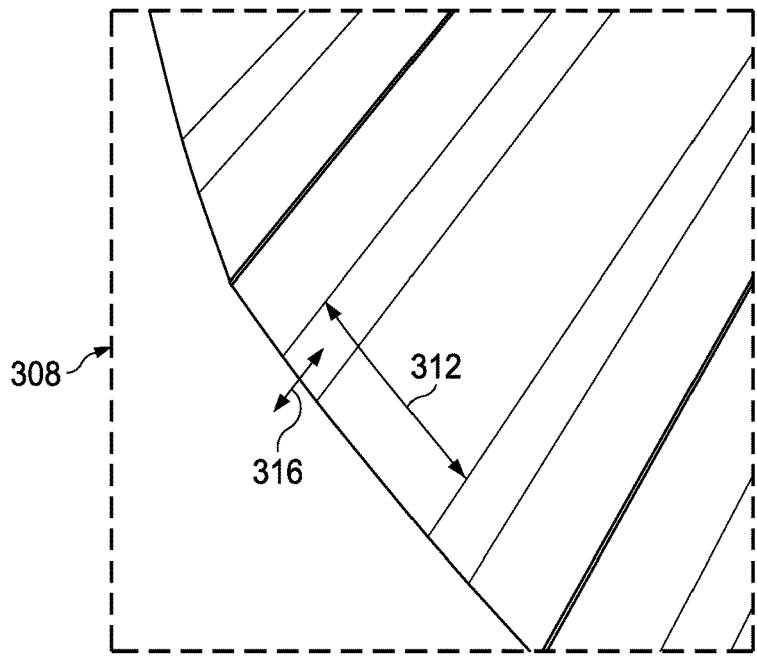
FIG. 5 illustrates a view of the payload structure shown in FIG. 3, in accordance with an illustrative embodiment.
Figure 6:
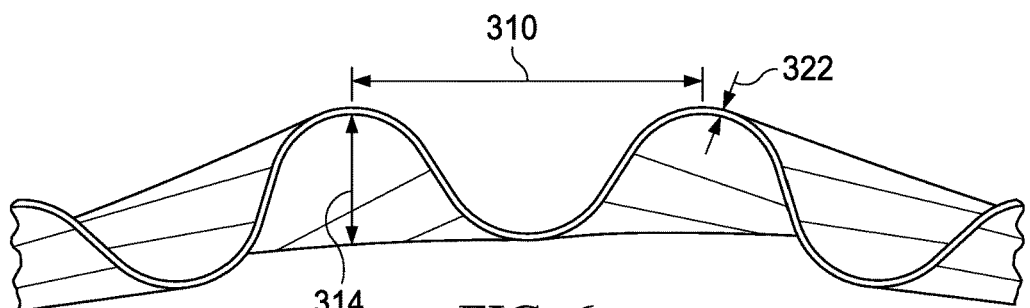
FIG. 6 illustrates a view of the payload structure shown in FIG. 3, in accordance with an illustrative embodiment.

FIG. 3 illustrates a payload structure for a spacecraft, in accordance with an illustrative embodiment. FIG. 3 through FIG. 5 should be viewed together, and thus share common reference numerals. FIG. 4 and FIG. 5 show expanded views of different parts of payload structure 300. FIG. 6 shows an on-edge view of the apex of payload structure 300, and is also an alternative view of payload structure 300 with respect to FIG. 4.

Payload structure 300 may replace payload structure 112 in FIG. 1 and FIG. 2. Payload structure 300 is an improvement over payload structure 112 in FIG. 1 and FIG. 2.

In particular, payload structure 300 may be characterized as a "corrugated shell", "corrugated skirt", or "corrugated hollow frustoconical structure". Payload structure 300 may also be characterized as a pair of wavy opposing skins between which is disposed a solid material. Payload structure 300 also may be characterized as a payload adaptor. Payload structure 300 also may be characterized as a corrugated payload adaptor structure.

In alternative illustrative embodiments, payload structure 300 need not be a corrugated hollow frustoconical structure. Instead, payload structure 300 may be a corrugated solid frustoconical structure. In this example, payload structure 300 becomes a conical solid instead of a shell, with a corrugated exterior. Whether solid or hollow, payload structure 300 provides for a mounting block that has interfaces with a narrow top (apex) and wider bottom (base), a distribution of thickened portions (corrugations) at the top that extend toward the bottom while reducing in height. Payload structure 300 may be termed an "interface" because payload structure 300 may serve as an interface between other parts of a launch vehicle, such as spacecraft 100 of FIG. 1, and a payload, such as cargo 108 of FIG. 1.

Past payload structures use metal or composite honeycomb sandwich stabilized structures to fashion payload structure 300. Typical honeycomb sandwich construction consists of composite solid laminate, or metal face sheets on either side of honeycomb core. This type of construction improves the structural stability and hence ability to carry load, over the solid face sheet material alone. However, the illustrative embodiments provide a solid material without additional stabilizing components, such as a plastic, though the corrugations may be used to improve the stability of payload structure 300 and the ability to react to torque, shear, compression, and pull-off loads. Payload structure 300 may also be formed from other composite materials, such as but not limited to a fiber reinforced laminate material.

The dimensions of payload structure 300 may vary. However, in a specific non-limiting example, payload structure 300 may be about 13 feet at base 302 and about 3 feet at apex 304. In this configuration, payload structure 300 may provide, in some examples, a physical transition from a rocket launch vehicle to a satellite structural interface within the rocket. The frustoconical shape transitions from the diameter of the launch vehicle to the diameter of a typical communications satellite interface, which may be about 13 feet and about 3 feet respectively. The term "about" means on the order of 10% difference in size. However, many other sizes are possible depending on implementation.

The overall frustoconical shape is composed of a corrugated or fluted solid laminate composite material, with corrugations providing stiffness near the small diameter upper end, that reduce in height towards the bottom of the frustoconical shape. The thickness of the shell may vary, being thinnest at base 302 and thickest at apex 304, though other types of variations in thickness are possible. This type of flexibility in shape and thickness is more complicated and expensive with existing metal or honeycomb payload structures.

FIG. 3 also shows period 310, period 312, longitudinal direction 318, and longitude 320. These features are used for reference when comparing FIG. 3 to FIG. 4, FIG. 5, and FIG. 6, as described further below.

A novel feature of a corrugation stiffened solid laminate cone is the ability to vary the corrugation height to tailor the skin stability of the cone from top to bottom. Deeper corrugations near the top, smaller diameter near the end of the frustoconical shape, can be reduced in height toward the bottom, larger end of the cone. The corrugated solid laminate cone structure simplifies the design by reducing the number of skins from two to one and eliminating the honeycomb core.

Stated differently, the application of corrugations to truncated conical composite structure offers weight reduction opportunities over unstiffened designs. In addition, the opportunity to vary corrugation amplitude and period facilitates optimizing local structural stability requirements for these thin shell structures with large dimensional difference between their extremities, (small top, large bottom).

Returning to FIG. 3 through FIG. 6, these structures may be seen in the figures. For example, FIG. 4 is an expanded view of area 306 of payload structure 300. In turn, FIG. 5 is an expanded view of area 308 of payload structure 300.

Referencing FIG. 4 and FIG. 5 together, one can see that the period 310 near apex 304 of payload structure 300 is shorter than period 312 near base 302 of payload structure 300. Period 310 varies along longitudinal direction 318 of the single shell, the period comprising a measure of how close the corrugations are to each other.

Likewise, one can see that amplitude 314 near apex 304 of payload structure 300 is greater than amplitude 316 near base 308 of payload structure 300. Thus, corrugations of the single shell vary in amplitude along longitudinal direction 316 of the frustoconical shape. Stated differently, amplitude 314 is a height between where the corrugations reach a maximum or a minimum relative to an average distance between minimums and maximums of the corrugations.

In addition, in some illustrative embodiments, the thickness of payload structure 300 is at a maximum near apex 304 and is at a minimum near base 302. However, in other illustrative embodiments, the maximum thickness may be at base 304, or at some point along the longitudinal length of payload structure 300. In still other illustrative embodiment, the thickness may be constant.

Thus, at any given longitude, such as for example at longitude 320, along the height of payload structure 300, period 310 and the amplitude of the corrugations, and the thickness, may be the same. However, at different latitudes, these values will be different. Thus, in one illustrative embodiment, near base 302, the corrugations may be small and far apart, whereas near apex 304, the corrugations may be large and closer to each other, relative to base 302 and apex 304.

As mentioned above, FIG. 6 shows an on-edge view of apex 304 of payload structure 300, and is also an alternative view of payload structure 300 with respect to FIG. 4. FIG. 6 shows another view of period 310 and amplitude 314. In addition, thickness 322 of payload structure 300 at apex 304 is shown. In an illustrative embodiment, thickness 322 is thicker than the thickness of payload structure 300 at base 302.

Also as mentioned above, payload structure 300 may be still further varied. In FIG. 3 through FIG. 6, the amplitude, the overall period, and thickness may vary smoothly and linearly from apex 304 to base 302. However, these values may be varied at any point along any given latitude, such as latitude 320, along payload structure 300. In other illustrative embodiments, corrugations may also vary based on longitudinal position along longitudinal direction 318. In still other illustrative embodiments, cross corrugations may be provided which vary by longitude, latitude, or both with respect to payload structure 300. In yet other illustrative embodiments, payload structure 300 may be a conical solid. In other illustrative embodiments still, payload structure 300 may have different shapes other than frustoconical, such as but not limited to an elliptical cone, a full cone, a cubic shape, a trapezoidal shape, or any other desired shape that is either a shell or a solid. Thus, the illustrative embodiments described with respect to FIG. 3 through FIG. 6 do not necessarily limit the claimed inventions.

Figure 7:
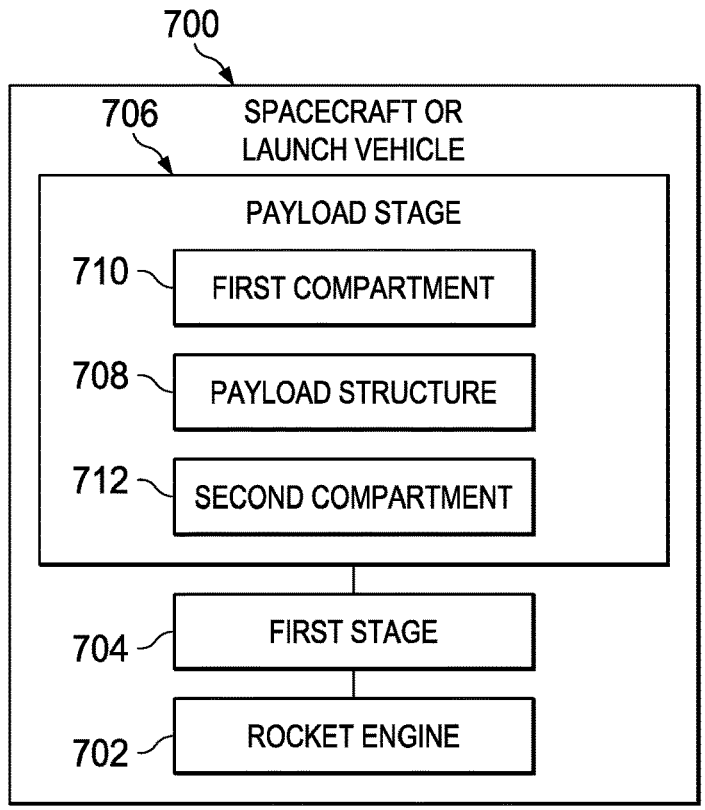
FIG. 7 illustrates a block diagram of a spacecraft, in accordance with an illustrative embodiment.

FIG. 7 illustrates a block diagram of a spacecraft, in accordance with an illustrative embodiment. An example of spacecraft 700 may be spacecraft 100 in FIG. 1 and FIG. 2. Likewise, payload structure 708 shown in spacecraft 700 may be a variation of payload structure 300 of FIG. 3 through FIG. 6, or payload structure 112 of FIG. 1 and FIG. 2.

Thus, spacecraft 700 may include rocket engine 702, first stage 704 connected to rocket engine 702, and payload stage 706 connected to first stage 704. More or fewer stages may be present.

Payload structure 708 may be inside payload stage 706 between first compartment 710 of payload structure 708 and second compartment 712 of payload stage 706. Payload structure 708 may be a single shell that has a corrugated shape such that an inside surface and an outside surface of the payload structure vary in shape to form the corrugations.

Spacecraft 700 may be varied. For example, in an illustrative embodiment, the single shell also forms a frustoconical shape. The single shell may be a composite material. In this case, the composite material may be a fiber reinforced laminate material. The composite material may be completely solid.

In another illustrative embodiment, corrugations of the single shell may vary in amplitude along a longitudinal direction of the frustoconical shape. The amplitude is a height between where the corrugations reach a maximum or a minimum relative to an average distance between minimums and maximums of the corrugations.

In this case, the amplitude is greatest at an apex of the single shell and is least at a base of the single shell. The corrugations of the single shell vary in period along the longitudinal direction of the single shell, the period comprising a measure of how close the corrugations are to each other. The period is shortest at the apex and longest at the base. In addition, a thickness of the single shell varies along the longitudinal direction of the single shell. The corrugations are arranged such that the single shell comprises a sinusoidal wave or a sinusoidal-like wave. As used herein, corrugations that form a "sinusoidal-like" wave do not conform to a perfectly sinusoidal shape, but may be wavy with a complex period and amplitude.

Other corrugation patterns are also possible. For example, the corrugations may be arranged such that the single shell comprises one of a square wave, a tringle wave, and a saw-tooth wave.

In another illustrative embodiment, a thickness of the single shell varies along a longitudinal direction of the single shell. In this case, the thickness may be greatest on a first side of the single shell and least on a second side of the single shell.

In another illustrative embodiment, corrugations of the single shell may vary in period along a longitudinal direction of the single shell. The period is a measure of how close the corrugations are to each other. In still another illustrative embodiment, the period is shortest at a first side of the single shell and is longest at a second side of the single shell.

Spacecraft 700 may be manufactured by a number of different techniques. For example, the single shell may be manufactured by one of: forming the single shell as a sheet and wrapping the single shell into a frustoconical shape; and forming the single shell in the frustoconical shape by a molding process. Other manufacturing process are also possible.

The illustrative embodiments described with respect to FIG. 7 may be further varied. More, fewer, or different components may be present. Thus, the claimed inventions are not necessarily limited by the illustrative embodiments described with respect to FIG. 7.

Figure 8:
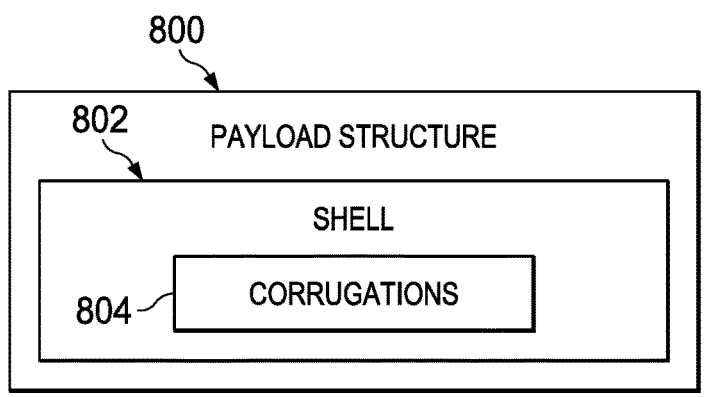
FIG. 8 illustrates a block diagram of payload structure, in accordance with an illustrative embodiment.

FIG. 8 illustrates a block diagram of payload structure, in accordance with an illustrative embodiment. Payload structure 800 may be a variation of payload structure 300 of FIG. 3 through FIG. 6, or payload structure 112 of FIG. 1 and FIG. 2.

Payload structure 800 includes shell 802. Shell 802 may be a fiber-reinforced composite laminate material. Alternatively, shell 802 may be formed from a composite material composed of short fibers in a plastic, or resin, matrix. Shell 802 may have a corrugated frustoconical shape such that an inside surface and an outside surface of the payload structure vary in shape to form corrugations 804. Corrugations 804 may vary in at least one of amplitude and period along a longitudinal direction of shell 802. The amplitude may be a height between where the corrugations reach a maximum or a minimum relative to an average distance between minimums and maximums of corrugations 804. The period may be a measure of how close corrugations 804 are to each other.

Payload structure 800 may be varied. For example, corrugations 804 vary in both amplitude and period.

In another illustrative embodiment, the amplitude is greatest at an apex of the shell, the amplitude is least at a base of the shell, the period is shortest at the apex, and the period is longest at the base. In this case, the shell may vary in thickness, and the shell may be thickest at the apex and thinnest at the base.

The illustrative embodiments described with respect to FIG. 8 may be further varied. More, fewer, or different operations may be present. Thus, the claimed inventions are not necessarily limited by the illustrative embodiments described with respect to FIG. 8.

Figure 9:
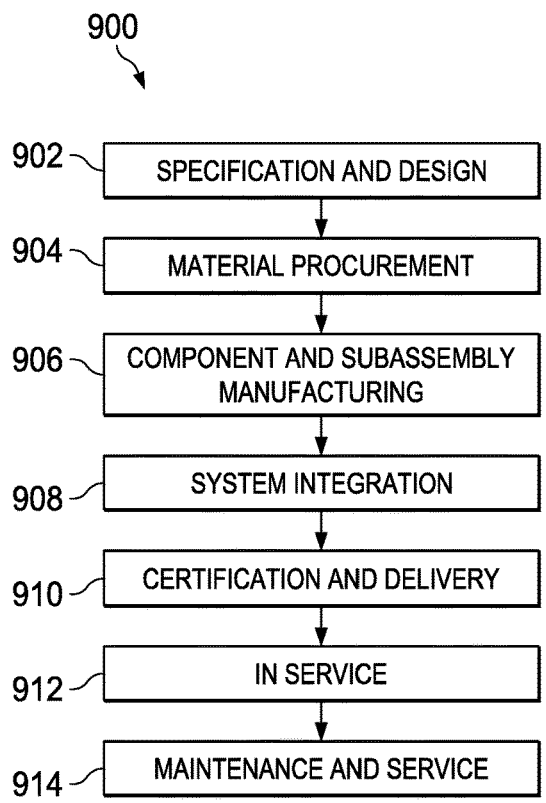
FIG. 9 illustrates a spacecraft or aircraft manufacturing and service method in accordance with an illustrative embodiment.
Figure 10:
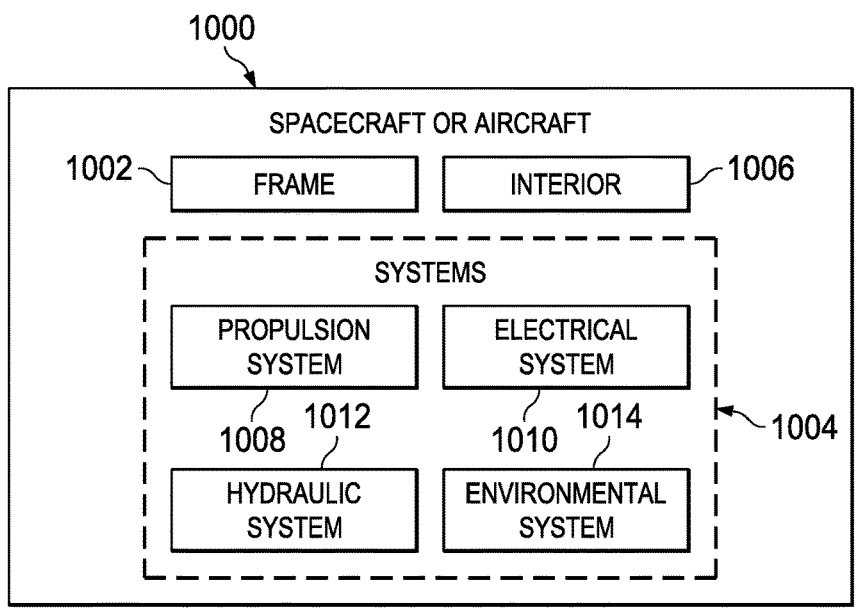
FIG. 10 illustrates a spacecraft or aircraft in which an illustrative embodiment may be implemented.

Illustrative embodiments of the disclosure may be described in the context of spacecraft or aircraft manufacturing and service method 900 as shown in FIG. 9 and spacecraft or aircraft 1000 as shown in FIG. 10. Turning first to FIG. 9, an illustration of a spacecraft or aircraft manufacturing and service method is depicted in accordance with an illustrative embodiment. During pre-production, spacecraft or aircraft manufacturing and service method 900 may include specification and design 902 of spacecraft or aircraft 1000 in FIG. 10 and material procurement 904.

During production, component and subassembly manufacturing 906 and system integration 908 of spacecraft or aircraft 1000 in FIG. 10 takes place. Thereafter, spacecraft or aircraft 1000 in FIG. 10 may go through certification and delivery 910 in order to be placed in service 912. While in service 912 by a customer, spacecraft or aircraft 1000 in FIG. 10 is scheduled for routine maintenance and service 914, which may include modification, reconfiguration, refurbishment, and other maintenance or service.

Each of the processes of spacecraft or aircraft manufacturing and service method 900 may be performed or carried out by a system integrator, a third party, and/or an operator. In these examples, the operator may be a customer. For the purposes of this description, a system integrator may include, without limitation, any number of spacecraft or aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a spacecraft or aircraft is depicted in which an illustrative embodiment may be implemented. In this example, spacecraft or aircraft 1000 is produced by spacecraft or aircraft manufacturing and service method 900 in FIG. 9 and may include frame 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of spacecraft or aircraft manufacturing and service method 900 in FIG. 9.

In one illustrative example, components or subassemblies produced in component and subassembly manufacturing 906 in FIG. 9 may be fabricated or manufactured in a manner similar to components or subassemblies produced while spacecraft or aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while spacecraft or aircraft 1000 is in service 912 and/or during maintenance and service 914 in FIG. 9. The use of a number of the different illustrative embodiments may substantially expedite the assembly of and/or reduce the cost of spacecraft or aircraft 1000.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A spacecraft comprising:
   a rocket engine;
   a first stage connected to the rocket engine;
   a payload stage connected to the first stage; and
   a payload structure inside the payload stage between a first compartment of the payload stage and a second compartment of the payload stage, the payload structure being a single shell that has a corrugated shape such that an inside surface and an outside surface of the payload structure vary in shape to form the corrugations;
   wherein the corrugations of the single shell vary in period along a longitudinal direction of the single shell, the period comprising a measure of how close the corrugations are to each other.

2. The spacecraft of claim 1, wherein the single shell also forms a frustoconical shape.

3. The spacecraft of claim 1, wherein the single shell comprises a composite material.

4. The spacecraft of claim 3, wherein the composite material comprises either a fiber reinforced laminate material or a composite material composed of short fibers in a plastic matrix.

5. The spacecraft of claim 4, wherein the composite material is completely solid.

6. The spacecraft of claim 2, wherein the corrugations of the single shell vary in amplitude along a longitudinal direction of the frustoconical shape, the amplitude comprising a height between where the corrugations reach a maximum or a minimum relative to an average distance between minimums and maximums of the corrugations.

7. The spacecraft of claim 6, wherein the amplitude is greatest at an apex of the single shell and is least at a base of the single shell.

8. The spacecraft of claim 7, wherein the period is shortest at the apex and longest at the base.

9. The spacecraft of claim 1, wherein a thickness of the single shell varies along the longitudinal direction of the single shell.

10. The spacecraft of claim 1, wherein the corrugations are arranged such that the single shell comprises a sinusoidal wave or a sinusoidal-like wave.

11. The spacecraft of claim 1, wherein the corrugations are arranged such that the single shell comprises one of a square wave, a tringle wave, and a saw-tooth wave.

12. The spacecraft of claim 1, wherein a thickness of the single shell varies along the longitudinal direction of the single shell, the thickness being greatest on a first side of the single shell and least on a second side of the single shell.

13. The spacecraft of claim 1, wherein the period is shortest at a first side of the single shell and is longest at a second side of the single shell.

14. The spacecraft of claim 1, wherein the single shell is manufactured by one of:
   forming the single shell as a sheet and wrapping the single shell into a frustoconical shape; and
   forming the single shell in the frustoconical shape by a molding process.

15. A payload structure comprising:
   a shell comprising a fiber-reinforced composite material, the shell having a corrugated frustoconical shape such that an inside surface and an outside surface of the payload structure vary in shape to form corrugations, and wherein corrugations vary in at least one of amplitude and period along a longitudinal direction of the shell, the amplitude comprising a height between where the corrugations reach a maximum or a minimum relative to an average distance between minimums and maximums of the corrugations, the period comprising a measure of how close the corrugations are to each other.

16. The payload structure of claim 15, wherein the corrugations vary in both amplitude and period.

17. The payload structure of claim 16, wherein the amplitude is greatest at an apex of the shell, wherein the amplitude is least at a base of the shell, wherein the period is shortest at the apex, and wherein the period is longest at the base.

18. The payload structure of claim 17, wherein the shell varies in thickness, and wherein the shell is thickest at the apex and thinnest at the base.

19. A spacecraft comprising:
a rocket engine;
a first stage connected to the rocket engine;
a payload stage connected to the first stage; and
a payload structure inside the payload stage between a first compartment of the payload stage and a second compartment of the payload stage, the payload structure being a single shell that has a corrugated shape such that an inside surface and an outside surface of the payload structure vary in shape to form the corrugations;
wherein the corrugations of the single shell vary in amplitude along a longitudinal direction of the single shell, the amplitude comprising a height between where the corrugations reach a maximum or a minimum relative to an average distance between minimums and maximums of the corrugations.

20. The spacecraft of claim 19, wherein the single shell also forms a frustoconical shape.

* * * * *